United States Patent
Newberry

(10) Patent No.: US 9,603,472 B2
(45) Date of Patent: Mar. 28, 2017

(54) POPCORN SALT HOLDING AND DISPENSING SYSTEM AND METHOD

(71) Applicant: Steven Newberry, West Lafayette, IN (US)

(72) Inventor: Steven Newberry, West Lafayette, IN (US)

( * ) Notice: Subject to any disclaimer, the term of this patent is extended or adjusted under 35 U.S.C. 154(b) by 0 days.

(21) Appl. No.: 14/707,060

(22) Filed: May 8, 2015

(65) Prior Publication Data

US 2016/0324345 A1    Nov. 10, 2016

(51) Int. Cl.
| | | |
|---|---|---|
| *A47G 19/24* | (2006.01) | |
| *A23L 1/18* | (2006.01) | |
| *A23L 1/237* | (2006.01) | |
| *B65D 25/22* | (2006.01) | |

(52) U.S. Cl.
CPC ............ *A47G 19/24* (2013.01); *A23L 1/1812* (2013.01); *A23L 1/237* (2013.01); *B65D 25/22* (2013.01); *A23V 2002/00* (2013.01)

(58) Field of Classification Search
CPC ....... A47G 19/24; B65D 25/22; A23L 1/1812; A23L 1/237; A23V 2002/00
USPC ..... 222/1, 173, 174, 179.5, 180–181.3, 478, 222/480, 142.1, 196.1, 142.2–142.9, 161; 220/751, 737
See application file for complete search history.

(56) References Cited

U.S. PATENT DOCUMENTS

| | | | | |
|---|---|---|---|---|
| 2,975,946 A | * | 3/1961 | Westgate | B65D 47/265 222/480 |
| 3,280,720 A | * | 10/1966 | Kuhn | A23L 1/1815 219/411 |
| 3,962,821 A | * | 6/1976 | Sharp | A01H 1/025 222/161 |
| 3,964,642 A | * | 6/1976 | Lesh | A47G 19/24 222/142.4 |
| 5,083,732 A | * | 1/1992 | Akamine | A61J 9/06 248/104 |
| 5,489,075 A | * | 2/1996 | Ible | A61J 9/06 24/298 |
| 6,076,700 A | | 6/2000 | Manges | |
| 6,152,362 A | | 11/2000 | Rosenfeld | |
| 6,386,443 B1 | | 5/2002 | Szczerbinski | |
| D479,994 S | | 9/2003 | Cendejas | |
| 6,926,173 B1 | * | 8/2005 | McGlothlin | A47G 19/24 220/253 |
| 7,717,144 B1 | * | 5/2010 | Bottega | A23L 1/1817 141/337 |

(Continued)

FOREIGN PATENT DOCUMENTS

WO    WO2005110863    11/2005

*Primary Examiner* — Donnell Long

(57) ABSTRACT

A popcorn salt holding and dispensing system and method includes a container that has a quantity of popcorn therein. The container has a bottom wall and a peripheral wall which is attached to and extends upwardly therefrom. The peripheral wall has an upper edge defining an opening extending into the container. A housing has salt therein and the housing includes a first end, a second end and a perimeter wall extending between the first and second ends. The first end has a plurality of apertures extending therethrough to allow salt from the housing to flow outwardly of the housing through the apertures. The housing is removably coupled to the container with a mounting and moved back and forth over the popcorn to deposit salt on the popcorn.

6 Claims, 4 Drawing Sheets

(56) References Cited

U.S. PATENT DOCUMENTS

| | | | |
|---|---|---|---|
| 2003/0080127 A1* | 5/2003 | Gibert | A47G 19/04 220/23.4 |
| 2005/0244549 A1 | 11/2005 | Ling | |
| 2007/0269573 A1* | 11/2007 | Boyer | B65D 5/328 426/589 |
| 2012/0234845 A1* | 9/2012 | Miller | A47G 23/0241 220/737 |
| 2014/0197187 A1 | 7/2014 | Perlmutter | |

* cited by examiner

POPCORN SALT HOLDING AND DISPENSING SYSTEM AND METHOD

BACKGROUND OF THE DISCLOSURE

Field of the Disclosure

The disclosure relates to popcorn salting devices and more particularly pertains to a new popcorn salting device for retaining salt in connection with a container of popcorn to facilitate salting of the popcorn as needed.

SUMMARY OF THE DISCLOSURE

An embodiment of the disclosure meets the needs presented above by generally comprising a container that has a quantity of popcorn therein. The container has a bottom and a peripheral wall which is attached to and extends upwardly therefrom. The peripheral wall has an upper edge defining an opening extending into the container. A housing has salt therein and the housing includes a first end, a second end and a perimeter wall extending between the first and second ends. The first end has a plurality of apertures extending therethrough to allow salt from the housing to flow outwardly of the housing through the apertures. The housing is removably coupled to the container with a mounting and moved back and forth over the popcorn to deposit salt on the popcorn.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
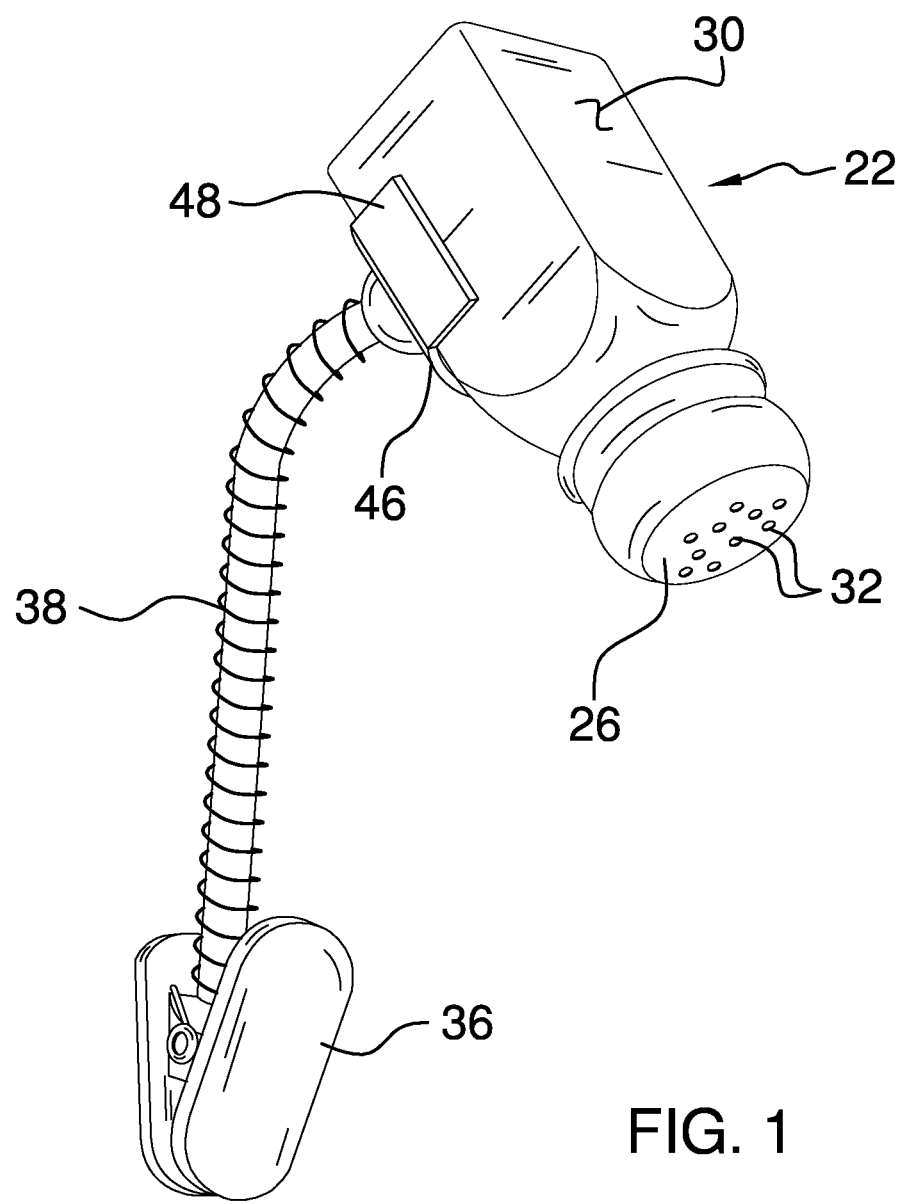
FIG. 1 is a perspective front view of a popcorn salt holding and dispensing system and method according to an embodiment of the disclosure.
Figure 2:
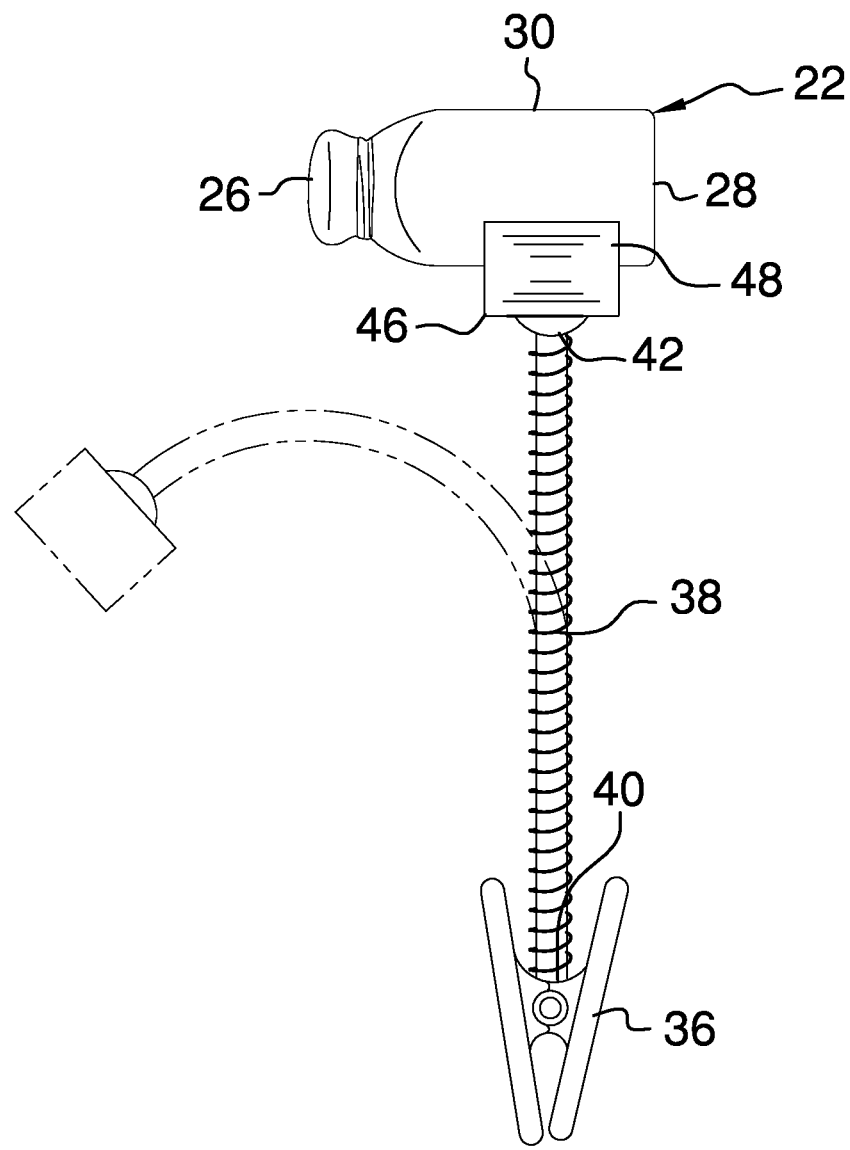
FIG. 2 is a side view of an embodiment of the disclosure.
Figure 3:
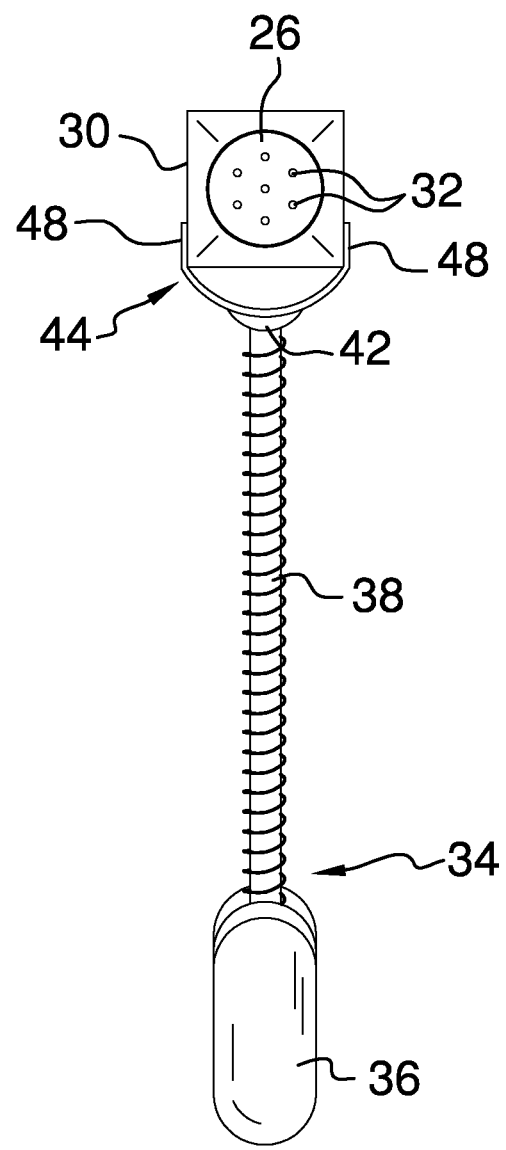
FIG. 3 is a front view of an embodiment of the disclosure.
Figure 4:
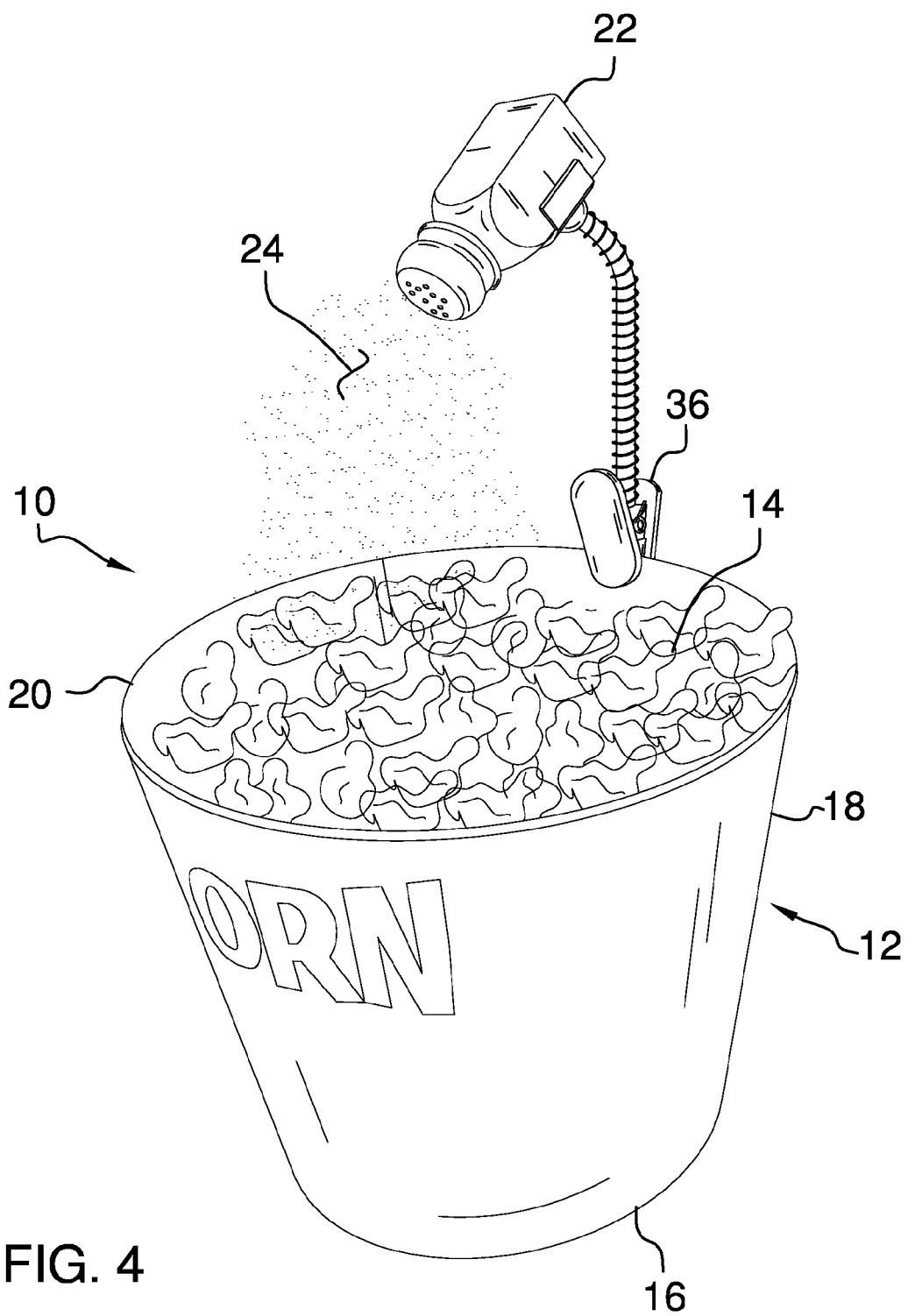
FIG. 4 is a perspective in-use view of an embodiment of the disclosure.

With reference now to the drawings, and in particular to FIGS. 1 through 4 thereof, a new popcorn salting device embodying the principles and concepts of an embodiment of the disclosure and generally designated by the reference numeral 10 will be described.

As best illustrated in FIGS. 1 through 4, the popcorn salt holding and dispensing system 10 and method generally comprises providing a container 12 that has a quantity of popcorn 14 therein. The container 12 and popcorn 14 are conventional and might generally be of the type purchased at a movie theater. The container 12 has a bottom wall 16 and a peripheral wall 18 that is attached to and extends upwardly therefrom. The peripheral wall 18 has an upper edge 20 defining an opening extending into the container 12.

A housing 22 is provided having salt 24 therein and may comprise a conventional salt shaker which may have a removable lid. However, the system 10 may provide for a housing 22 that is sealed and is not meant to be refilled. The housing 22 has a first end 26, a second end 28 and a perimeter wall 30 extending between the first 26 and second 28 ends. The first end 26 has a plurality of apertures 32 extending therethrough to allow salt 24 from the housing 22 to flow outwardly of the housing 22 through the apertures 32.

The housing 22 is removably coupled to the container 12 with a mounting 34 such that the first end 26 of the housing 22 is positioned over the container 12. The mounting 34 includes a clip 36 and a post 38 having a first end 40 and a second end 42. The first end 40 is attached to the clip 36 and the clip 36 is attached to the container 12 adjacent to the upper edge 20. The clip 36 is a conventional spring type clip and is removable from the container 12. The second end 42 is attached to the housing 22. The second end 42 may include a coupler 44 that releasably engages the housing 22 so that the housing 22 may be removed or replaced as needed. The coupler 44 may include a saddle 46 which frictionally engages the perimeter wall 30 with a pair of arms 48 biased towards each other due to the material characteristics of the saddle. However, the second end 42 may be non-removably attached to the housing 22. The post 38 is bendable and may be resiliently bendable such that it attempts to retain a generally straight configuration. As can be seen in FIG. 1, the weight of the housing 22 may cause a bend to form in the post 38. The post 38 may be comprised of a plastic or elastomeric material to resist bending and may further include a wound spring positioned on the post 38 to urge it into the straight configuration.

Once the clip 36 has been attached to the container 12, the housing 22 may be moved back and forth over the popcorn 14 to deposit salt 24 on the popcorn 14. By retaining the housing 22 in connection with the container 12, the user need not utilize a pocket or some other area to store the salt 24 for usage as it is needed since the popcorn 14 will typically be less salted as one moves towards a bottom of the container 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of adding salt to popcorn, said method comprising the steps of:
   providing a container having a quantity of popcorn therein, said container having a bottom wall and a peripheral wall being attached to and extending upwardly therefrom, said peripheral wall having an upper edge defining an opening extending into said container;
   providing a housing having salt therein, said housing having a first end, a second end and a perimeter wall extending between said first and second ends, said first end having a plurality of apertures extending therethrough to allow salt from said housing to flow outwardly of said housing through said apertures;
   removably coupling said housing to said container with a mounting; and
   moving said housing back and forth over said popcorn to deposit salt on said popcorn.

2. The method of adding salt to popcorn according to claim 1, wherein the method of removably coupling said housing to said container with a mounting further includes mounting comprising:
   a clip; and
   a post having a first end and a second end, said first end being attached to said clip, said clip being attached to said container adjacent to said upper edge, said second end being attached to said housing.

3. A method of adding salt to popcorn, said method comprising the steps of:
   providing a container having a quantity of popcorn therein, said container having a bottom wall and a peripheral wall being attached to and extending upwardly therefrom, said peripheral wall having an upper edge defining an opening extending into said container;
   providing a housing having salt therein, said housing having a first end, a second end and a perimeter wall extending between said first and second ends, said first end having a plurality of apertures extending therethrough to allow salt from said housing to flow outwardly of said housing through said apertures;
   removably coupling said housing to said container with a mounting, said mounting including:
      a clip;
      a post having a first end and a second end, said first end being attached to said clip, said clip being attached to said container adjacent to said upper edge, said second end being attached to said housing, said second end including a coupler releasably engaging said housing, a said post being resiliently bendable; and
   moving said housing back and forth over said popcorn to deposit salt on said popcorn.

4. A salt holding assembly configured for holding a salt dispenser over a container of popcorn, said assembly including:
   a housing having salt therein, said housing having a first end, a second end and a perimeter wall extending between said first and second ends, said first end having a plurality of apertures extending therethrough to allow salt from said housing to flow outwardly of said housing through said apertures; and
   a mounting attached to said housing and being configured to engage a container having popcorn therein.

5. The salt holding assembly according to claim 4, wherein said mounting includes:
   a clip;
   a post having a first end and a second end, said first end being attached to said clip, said clip being configured to engage the container, said second end being attached to said housing, said post being bendable.

6. The salt holding assembly according to claim 5, wherein said post is resiliently bendable.

* * * * *